US011619505B2

(12) United States Patent
Gerrese et al.

(10) Patent No.: US 11,619,505 B2
(45) Date of Patent: Apr. 4, 2023

(54) AUTONOMOUS VEHICLE INTERMEDIATE STOPS

(71) Applicant: GM Cruise Holdings LLC, San Francisco, CA (US)

(72) Inventors: Alexander Willem Gerrese, San Francisco, CA (US); Jeffrey Shaw, San Francisco, CA (US); Yifei Zhang, San Francisco, CA (US); Jeremy Stephen Juel, San Francisco, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 271 days.

(21) Appl. No.: 16/929,441

(22) Filed: Jul. 15, 2020

(65) Prior Publication Data

US 2022/0017120 A1  Jan. 20, 2022

(51) Int. Cl.
G01C 21/34 (2006.01)
G05D 1/00 (2006.01)

(52) U.S. Cl.
CPC ....... G01C 21/3438 (2013.01); G05D 1/0088 (2013.01); G05D 2201/0213 (2013.01)

(58) Field of Classification Search
CPC combination set(s) only.
See application file for complete search history.

(56) References Cited

U.S. PATENT DOCUMENTS

| 8,880,270 B1* | 11/2014 | Ferguson | B60W 30/00 705/6 |
|---|---|---|---|
| 10,156,449 B2 | 12/2018 | Colijn et al. | |
| 2018/0308064 A1* | 10/2018 | Glaser | G01C 21/3484 |
| 2019/0012625 A1* | 1/2019 | Lawrenson | G07C 5/008 |
| 2019/0051171 A1* | 2/2019 | Malkes | G08G 1/08 |
| 2019/0064808 A1 | 2/2019 | Dyer et al. | |
| 2019/0311417 A1* | 10/2019 | Randisi | G06Q 50/30 |
| 2020/0026279 A1* | 1/2020 | Rhodes | G01C 21/3476 |
| 2020/0027354 A1* | 1/2020 | Goldman | G07C 5/008 |
| 2020/0051194 A1* | 2/2020 | Park | G06Q 50/28 |
| 2020/0192363 A1* | 6/2020 | Landy | G08G 1/005 |
| 2021/0063190 A1* | 3/2021 | Saito | G01C 21/343 |
| 2021/0072037 A1* | 3/2021 | Lee | G06Q 10/06315 |
| 2021/0133847 A1* | 5/2021 | Mezaael | G06Q 10/0836 |
| 2021/0201212 A1* | 7/2021 | Tang | G06N 3/08 |
| 2021/0248533 A1* | 8/2021 | Kochar | G01C 21/20 |

* cited by examiner

Primary Examiner — Anne Marie Antonucci
Assistant Examiner — Amelia Vorce
(74) Attorney, Agent, or Firm — Akona IP

(57) ABSTRACT

Systems and methods are provided for adding stops to an autonomous vehicle route. A passenger can request an intermediate stop during which the passenger can exit the autonomous vehicle. An intermediate stop request may include a stop duration. Autonomous vehicle driving behavior during the intermediate stop may include parking, driving around, and performing a different route.

20 Claims, 6 Drawing Sheets

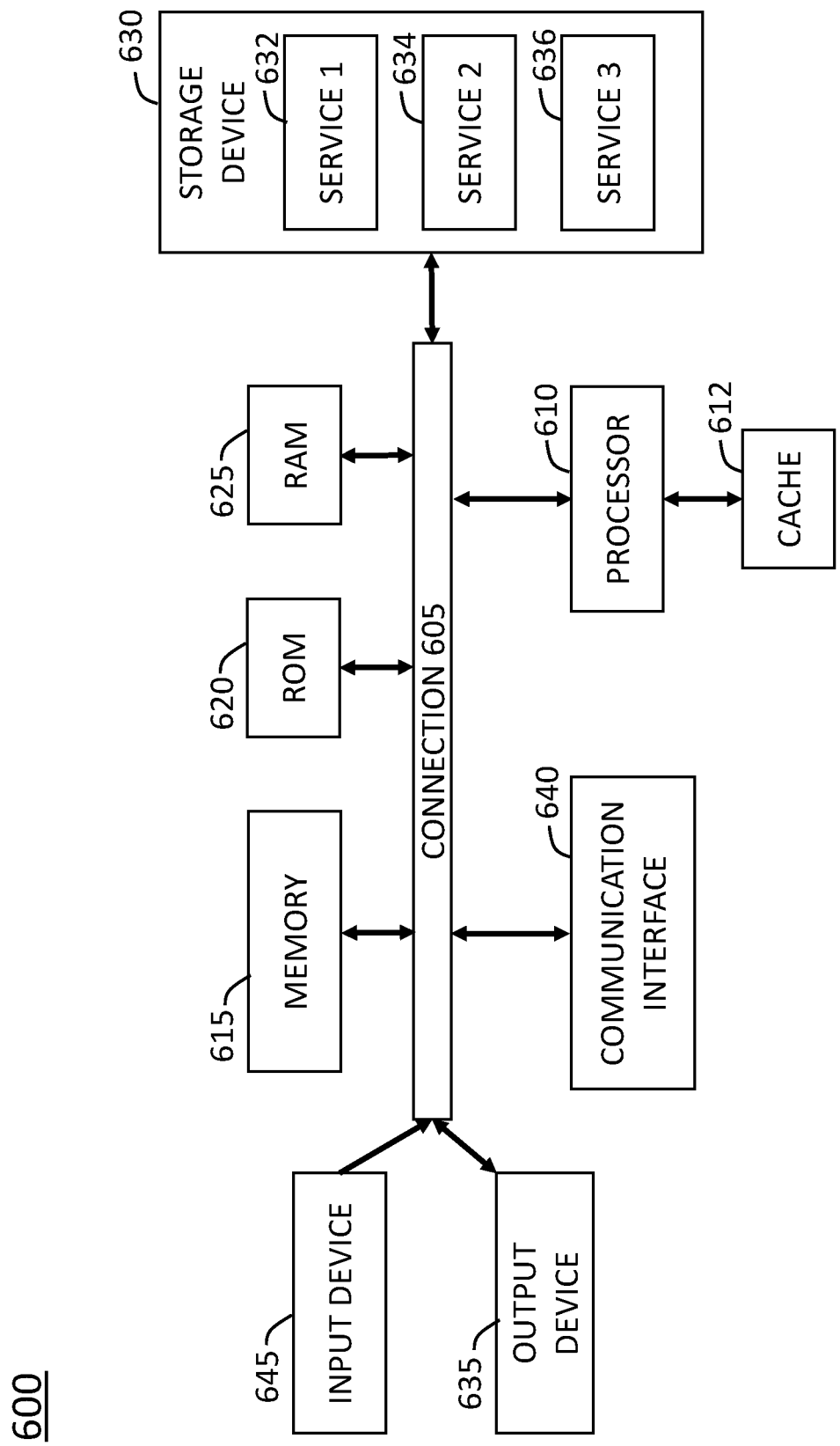

AUTONOMOUS VEHICLE INTERMEDIATE STOPS

FIELD OF THE DISCLOSURE

The present disclosure relates generally to autonomous vehicles (AVs) and to systems and methods for intermediate stopping points and intermediate stopping intervals.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are often used to provide rides to passengers who remotely request a vehicle for a selected pick up location and destination. Some passenger trip requests include multiple destinations. In some instances, after a passenger arrives at a first destination, the passenger then submits a second request for a ride to a second destination.

SUMMARY

Systems and methods are provided for allowing passengers to select intermediate stopping points on a route. In particular, passengers can select intermediate stopping points as well as intermediate stopping intervals, such that the passenger can leave the vehicle and return to the vehicle at a later point in time. The passenger can select the location of the intermediate stopping point as well as the time at which an autonomous vehicle will return to pick up the passenger to continue the route to the final destination.

According to one aspect, a method for adding stops to an autonomous vehicle route includes receiving a ride request including a pick-up location and a destination location, picking up a passenger at the pick-up location, receiving an intermediate stop request, wherein the intermediate stop request includes a stopping interval, dropping off the passenger at the intermediate stop, and determining autonomous vehicle driving behavior during the intermediate stop.

According to various implementations, the method further includes predicting the stopping interval based on a previous stop request. According to some implementations, the method includes predicting the stopping interval based on type of stop location. According to some examples, determining autonomous vehicle driving behavior during the intermediate stop includes one or more of parking the autonomous vehicle and driving the autonomous vehicle. According to some examples, driving the autonomous vehicle comprises driving the autonomous vehicle along a circular route. According to some examples, driving the autonomous vehicle comprises fulfilling at least one second ride request.

According to various implementations, the method includes picking up the passenger at the intermediate stop, and continuing to the destination location. According to some implementations, receiving the ride request includes receiving the intermediate stop request. According to some implementations, the method includes discontinuing the autonomous vehicle route at the intermediate stop.

According to another aspect, a method for providing routes to a set of autonomous vehicles includes receiving a ride request including a pick-up location and a destination location, selecting a first autonomous vehicle from the set of autonomous vehicles for fulfilling the ride request, routing the first autonomous vehicle to the pick-up location, receiving an intermediate stop request for the ride request, wherein the intermediate stop request includes an intermediate stop location and a stopping interval, routing the first autonomous vehicle to the intermediate stop location, and determining whether to route the first autonomous vehicle to the intermediate stop location at an end of the stopping interval.

According to various implementations, determining whether to route the first autonomous vehicle to the intermediate stop location at an end of the stopping interval includes determining not to route the first autonomous vehicle to the intermediate stop location at the end of the stopping interval, and routing a second autonomous vehicle to the intermediate stop location at the end of the stopping interval. According to some implementations, the system includes determining driving behavior of the first autonomous vehicle during the stopping interval. According to some implementations, determining the driving behavior during the stopping interval includes at least one of routing the first autonomous vehicle to a parking space and routing the first autonomous vehicle along a circular route. According to various examples, determining the driving behavior during the stopping interval includes selecting the first autonomous vehicle for fulfilling a second ride request.

According to various implementations, the system includes updating the stopping interval, wherein updating the stopping interval includes updating an end time of the stopping interval. According to some implementations, updating the stopping interval includes predicting the stopping interval based on one of a previous stop request and type of stop location.

According to another aspect, a system for addition of an intermediate stop to an autonomous vehicle route, includes a central computing system and an onboard computing system. The central computing system includes a routing coordinator configured to receive a ride request including a pick-up location and a destination location, and select a first autonomous vehicle for fulfilling the ride request. The onboard computing system on the first autonomous vehicle configured to pick up a passenger at the pick-up location, receive an intermediate stop request, wherein the intermediate stop request includes an intermediate stop location and a stopping interval, and drop off the passenger at the destination location.

According to various implementations, the central computing system is further configured to receive the intermediate stop request, and send the intermediate stop request to the first autonomous vehicle. According to some implementations, the central computing system is further configured to route the first autonomous vehicle to the intermediate stop location, and determine whether to route the first autonomous vehicle to the intermediate stop location at an end of the stopping interval. According to some implementations, the central computing system is further configured to determine first autonomous vehicle driving behavior during the stopping interval, and send routing instructions to the first autonomous vehicle.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 shows an example embodiment of a system for implementing certain aspects of the present technology.

DETAILED DESCRIPTION

Overview

Systems and methods are provided for intermediate stops along autonomous vehicle routes. In particular, systems and methods are provided for allowing a passenger to pause a ride, exit the autonomous vehicle, and return to the autonomous vehicle a short while later. In some examples, a passenger may exit the vehicle to run an errand, such as to pick up dry cleaning, do some shopping, or go to the bank. While the ride is paused, the autonomous vehicle may park, circle the block, and/or drive another route, before returning to pick up the passenger. The autonomous vehicle picks up the passenger after the stop and continues along the passenger's route to another stop and/or to the final destination. In some implementations, the autonomous vehicle is part of a fleet of autonomous vehicles, and a different autonomous vehicle in the fleet picks up the passenger after the stop and continues along the route.

As more people use ride services in place of owning cars, there is a need for an easy way to use ride services to run errands. For example, passengers may want to use a ride to service pick up groceries, dry cleaning, or their child. For these types of trips, the vehicle stops and waits while passengers exit the car briefly before returning to complete the trip. Without the ability to request that the vehicle stop and wait, passengers must end their ride and request another one a few minutes later. While current rideshare apps allow passengers to request a quick stop, this is a problematic process as the driver may not wait for the passenger if there is nowhere to stop, and/or no clear knowledge of the passenger's return time, and/or no way for the driver to communicate with the passenger. Additionally, due to the pricing models of rideshare apps, the driver may not be compensated for additional waiting time.

Example Autonomous Vehicle Configured for Ride Requests

Figure 1:
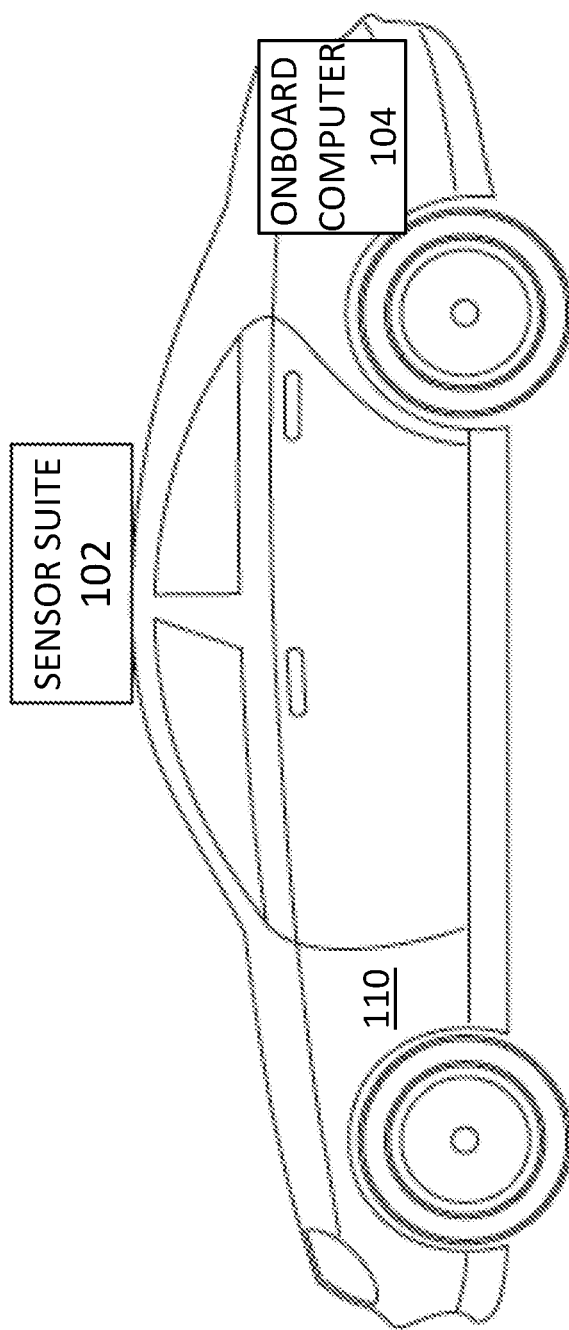
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high fidelity map. In particular, data from the sensor suite can be used to update a map with information used to develop layers with waypoints identifying selected events, the locations of the encountered events, and the frequency with which the events are encountered at the identified location. In some examples, the presence and location of open parking spaces is detected and this information is recorded in a mapping system. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passenger belongings left inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences. In some examples, a passenger requests that the autonomous vehicle 110 modify its route to add a selected intermediate stop.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Adding Intermediate Stops

Figure 2:
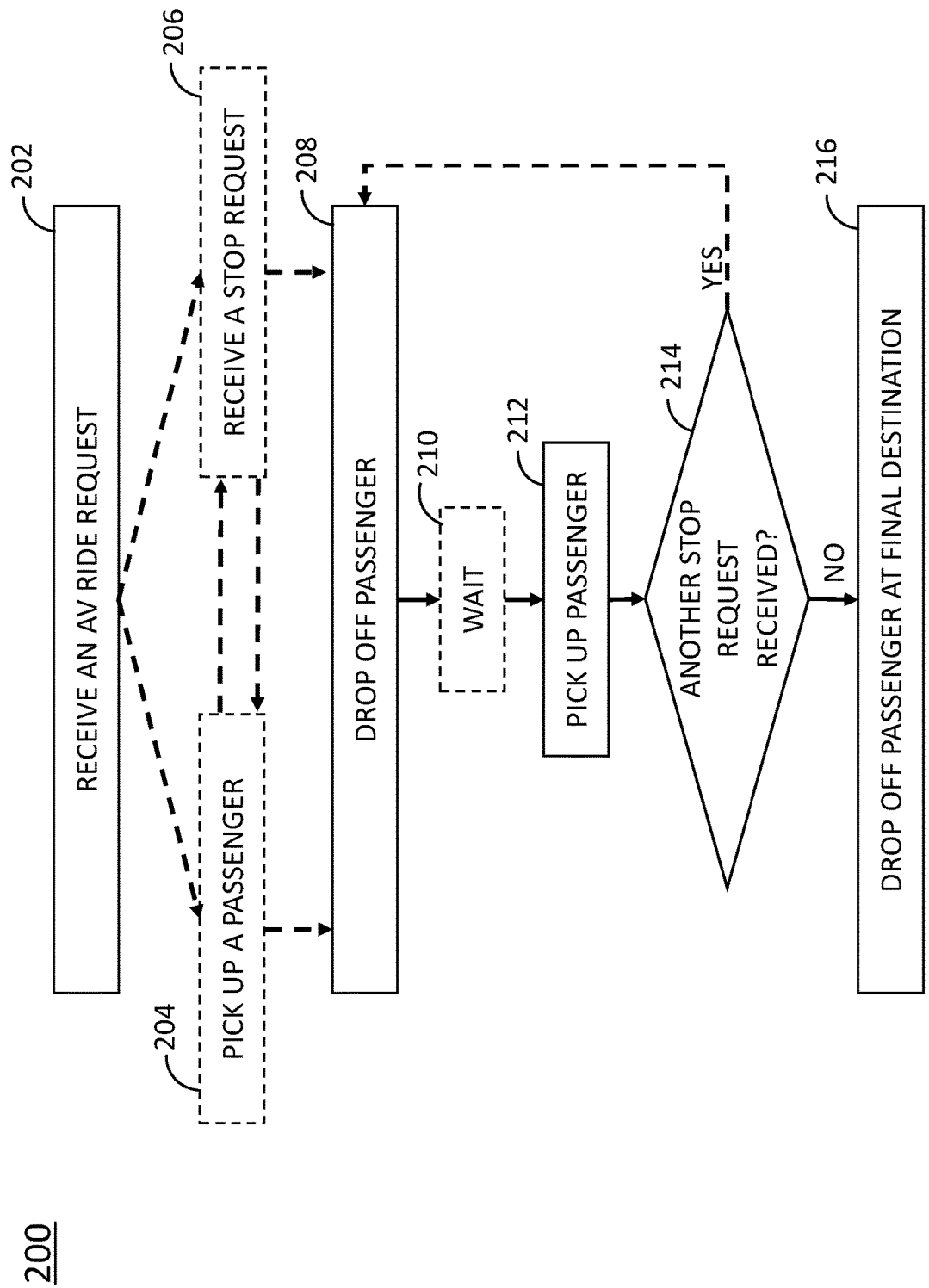
FIG. 2 is a diagram illustrating a method for adding one or more intermediate stops to an autonomous vehicle route, according to some embodiments of the disclosure.

FIG. 2 is a diagram illustrating a method 200 for adding one or more intermediate stops to an autonomous vehicle route, according to various embodiments of the invention. At step 202, an autonomous vehicle ride request is received. The ride request includes a pick up location and a destination location. In various examples, the ride request also includes passenger (user) identification.

At step 204, an autonomous vehicle picks up the passenger at the pick-up location. At step 206, a stop request is received. In some examples, the stop request is received (step 206) before the passenger is picked up (step 204). In some examples, the stop request is received (step 206) after the passenger is picked up (step 204). In some examples, the stop request is included with the ride request. The stop request includes a stop location as well as a stop duration.

In some implementations, the stop is suggested to the passenger after the passenger submits the ride request. A stop suggestion may be based on previous stop requests made by the passenger. A stop suggestion may be based on previous stop requests made by other passengers. In some examples, the stop suggestion is an advertisement for a particular store or franchise.

At step 208, the passenger is dropped off at the stop location. After dropping off the passenger, at step 210, the autonomous vehicle waits for the passenger to return. As described in further detail with reference to FIG. 3, waiting may include parking, circling the block, and/or performing another ride.

At step 212, the autonomous vehicle picks up the passenger. In some examples, the autonomous vehicle picks up the passenger at the stop location. In other examples, the autonomous vehicle picks up the passenger at another location nearby the stop location. The autonomous vehicle picks up the passenger at the end of the stop duration. However, in some implementations, the duration of the stop can be modified by the passenger during the stop interval. For example, if the passenger completes the errand more quickly than expected, the passenger can request the stop duration be shortened and the autonomous vehicle return earlier than originally requested. In another example, if the passenger's errand takes longer than expected, the passenger can request extra time before pick up. In some examples, the passenger can request a selected number of extra minutes before pick up. In some implementations, a passenger can cancel the ride during the intermediate stop, and the autonomous vehicle does not return to pick up the passenger.

In some implementations, the stop duration is predicted based on the stop location. In one example, the stop duration prediction is based on the type of services and/or goods offered at the stop location. For example, a stop at a dry cleaner or a coffee shop may be predicted to be shorter than a stop at a grocery store. In some instances, the stop is a quick curb-side pick-up. In some examples, stop duration predictions are based on previous stops made by the same passenger at the same location. In some examples, stop duration predictions are based on previous stops made by other passengers at the same location. In some examples, stop duration predictions are based on previous stops made by the same passenger at similar locations. In some examples, stop duration predictions are based on previous stops made by other passengers at the similar location. Stop during predictions may consider GPS location of the stop, including specific location of the passenger inside a store. Stop duration predictions may also consider the time of day, since certain times of day may be consistently (and predictably) busier than other times of day.

In some examples, the passenger remains in the vehicle during the intermediate stop interval. For example, if the stop request is a location with a drive through, the passenger remains in the autonomous vehicle while the vehicle proceeds to the drive-through lane. The autonomous vehicle drives through the drive-through lane, and stops at the indicated locations to allow the passenger to order and/or pick up an order.

In some implementations, step 206 includes more than one stop request, and the ride continues to another stop at step 208. In some implementations, more than one intermediate stop is requested. After the passenger is picked up at step 212, if another stop request is received at step 214, the method returns to step 208.

If there was not another intermediate stop request, the method proceeds to step 216, and the passenger is dropped off at the final destination. In some examples, at the final destination, the passenger is given the option to end the ride or to have the autonomous vehicle wait, thus returning the method to step 208.

In various implementations, the likelihood of a stop request is predicted based on various factors. In one example, the trip history is considered in predicting stop request likelihood. In another example, passengers allow the ride request app to access their calendar and/or notes, and the app detects tasks such as "pick up dry cleaning" or "buy vegetables", and suggests the passenger add a stop on the route.

Example Method for Autonomous Vehicle Stopping Interval

Figure 3:
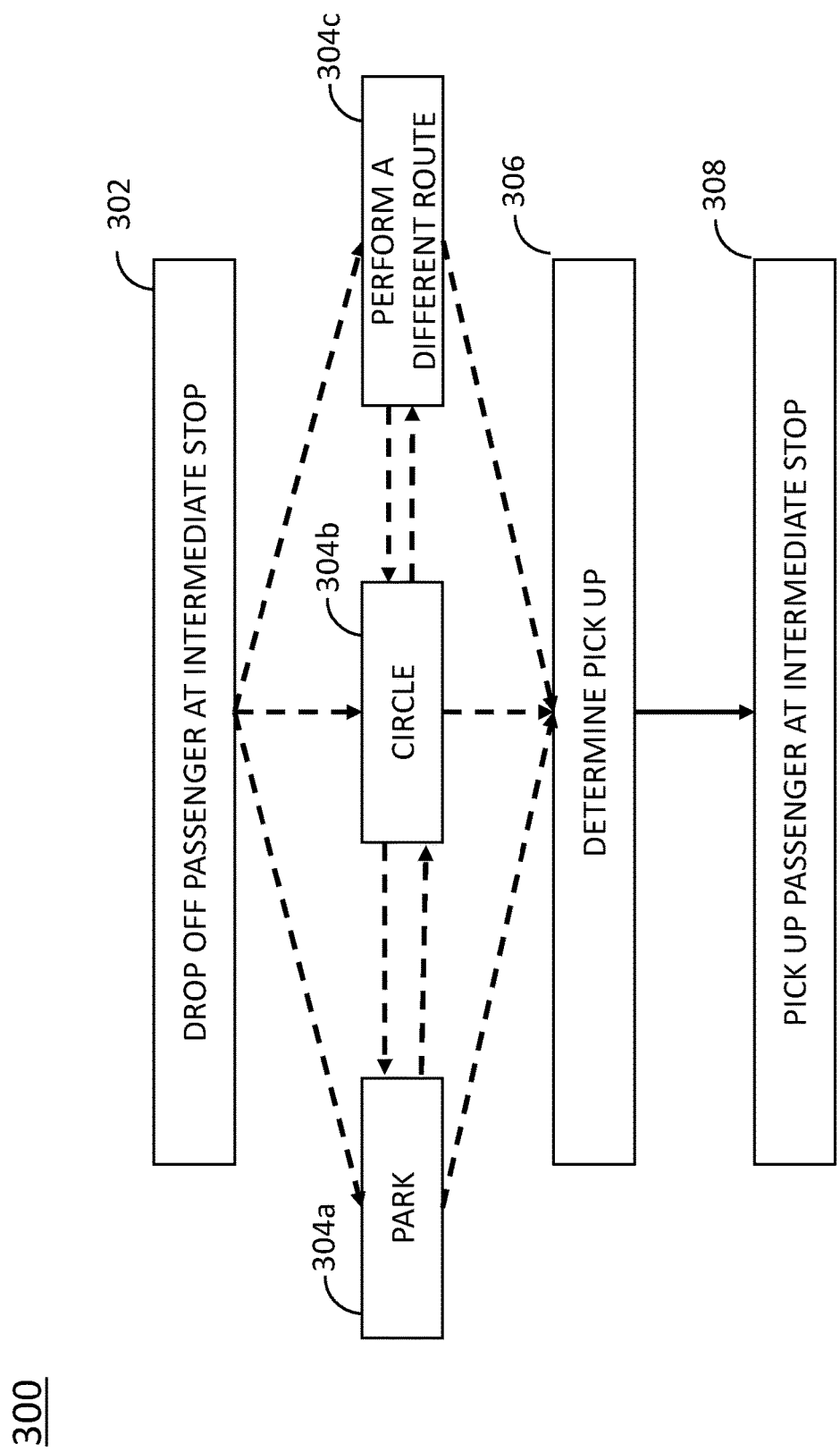
FIG. 3 is a diagram illustrating a method for autonomous vehicle routing after adding one or more intermediate stops according to some embodiments of the disclosure.

FIG. 3 is a diagram illustrating a method 300 for autonomous vehicle routing after adding one or more intermediate stops, according to various embodiments of the invention. In particular, FIG. 3 illustrates multiple different routing options for an autonomous vehicle during an intermediate stop. At step 302, the autonomous vehicle drops off a passenger at an intermediate stop.

Next, the autonomous vehicle proceeds to one or more of steps 304a, 304b, and 340c. In some examples, at step 304a, the autonomous vehicle parks and waits for an indication that the passenger is ready to be picked up. In particular, the autonomous vehicle may use data from sensors in the sensor suite (such as sensor suite 102 of FIG. 1) to evaluate whether there are any nearby parking spaces and/or stopping spaces. This may include a space in a parking lot and/or street parking. The autonomous vehicle has access to information about whether parking in detected parking spaces is legal. This information may be included, for example, in autonomous vehicle maps. If the autonomous vehicle detects a parking space and/or stopping space, the autonomous vehicle may park in the space. In some examples, the autonomous vehicle receives information about a nearby parking space from a central computer and/or from another autonomous vehicle, and the autonomous vehicle drives to a parking space. In some examples, there are "hot spots" available for stopping in, where hot spots are common pick-up and drop-off areas for rideshare vehicles. In some examples, a fleet of autonomous vehicles may rent various parking spaces or a parking lot for use by vehicles in the fleet.

In some examples, at step 304b, the autonomous vehicle continues to drive. The autonomous vehicle may drive around until it receives an indication that the passenger is ready to be picked up. In some instances, the autonomous vehicle does not find a parking spot nearby to park in, and without a place to park, it continues driving. In some examples, the autonomous vehicle drives to a parking space to wait. In some examples, the autonomous vehicle detects an open parking space while driving around and parks in the detected parking space to wait. In some examples, at step 304c, the autonomous vehicle picks up another passenger and performs another route while waiting for the first passenger. In other examples, at step 304c, the autonomous vehicle picks up goods for delivery and performs a delivery route while waiting for the first passenger. In various implementations, the autonomous vehicle may perform any or all of steps 304a, 304b, and 304c while waiting to pick up the passenger. In some examples, when the passenger exits the vehicle, the passenger is asked to confirm that the passenger would like the vehicle to return, and the passenger is also given the option of ending the ride.

In some examples, the autonomous vehicle performs other tasks while waiting for the passenger. The autonomous vehicle may take photos for a database. The autonomous vehicle may record traffic or other data on a nearby route.

The routing of the autonomous vehicle during the intermediate stop, after the passenger has exited the vehicle, depends on a number of factors. In a first example, it is determined whether the passenger has requested exclusive use of the vehicle during the stop, such that no other passengers will use the vehicle during the stop. If the passenger has requested exclusive use of the vehicle, the autonomous vehicle will not proceed from step 302 to 304c. In some examples, a passenger may request exclusive use so that the passenger can leave personal belongings in the autonomous vehicle. In other examples, the passenger may request exclusive use to decrease any potential wait time for pick up after the stop. In some examples, there are multiple passengers in the vehicle for the single ride request, and one or more passengers remain in the vehicle during the intermediate stop interval. The passenger may request exclusive use for any reason.

In various implementations, the passenger pays an extra fee for exclusive use of the autonomous vehicle during the intermediate stop. The fee may change depending on the duration of the stop. In some examples, during the intermediate stop, a passenger can add extra time to the stop duration for an extra fee. Exclusive use of the autonomous vehicle may not always be an available option for an intermediate stop added during a route. For example, if the autonomous vehicle has another pick up scheduled following the route, it may not be available for exclusive use.

In a second example, the duration of the stop is considered in determining autonomous vehicle route during the stop. For example, during a short stop duration, if no parking is available, the autonomous vehicle may simple drive around the block and return to pick up the passenger. In another example, during a long stop duration, the autonomous vehicle fulfills another ride request before returning to pick up the passenger.

In a third example, the location of the stop is considered in determining autonomous vehicle routing during the stop. If the stop is in a remote location, there may not be any different routes (rider requests) to perform during the stop. Additionally, if the stop is in a remote location, even during a long stopping interval, there may not be time to return to another location to perform a different route.

In a fourth example, the battery charge on the autonomous vehicle is considered in determining autonomous vehicle routing during the stop. For example, if a passenger requests a two-hour stop, the autonomous vehicle will still need to have enough charge left on its battery after the stopping interval when it picks up the passenger at the intermediate stop (at step 308) to drive to the final destination. Thus, whether the autonomous vehicle performs different routes during the stopping interval depends on whether it has sufficient battery charge for the additional routes and the route to the final destination. In some examples, the autonomous vehicle may route to a charging station to charge its battery during an intermediate stop.

At step 306, the autonomous vehicle determines a pick up time and location for the passenger. During the intermediate stop, the pick-up time may change for various reasons. For example, the passenger can adjust the pick-up time. The passenger may be running late or the passenger may be early. At step 306, the pick-up time is confirmed. In some examples, the passenger is prompted with reminders as the pick-up time approaches and asked to confirm the pick up time.

Additionally, in some examples, at step 306, the pick-up location is determined. In various examples, the pick-up location may differ slightly from the drop off location. For example, the pick-up location may be around the corner, or in a parking space a half a block away. Adjusting the pick-up location can allow for faster pick up of the passenger, especially in high traffic areas. In some examples, the passenger can request that the pick-up location be within a selected walking distance of the drop off location. In some examples, the passenger can request the pick-up location be the same as the drop off location. For instance, if the passenger is mobility-impaired, the passenger may prefer to wait than to walk a short distance to the autonomous vehicle. At step 308, the passenger is picked up from the intermediate stop.

In some implementations, the passenger fails to return to the autonomous vehicle after the intermediate stop. The autonomous vehicle may wait for the passenger for a selected amount of time before ending the route. In some examples, the passenger is charged a penalty for the wait duration as well as a penalty for not canceling the ride. If the passenger leaves items in the vehicle, the vehicle is routed back to a depot where the items can be removed and dealt with.

Example of Autonomous Vehicle Fleet

Figure 4:
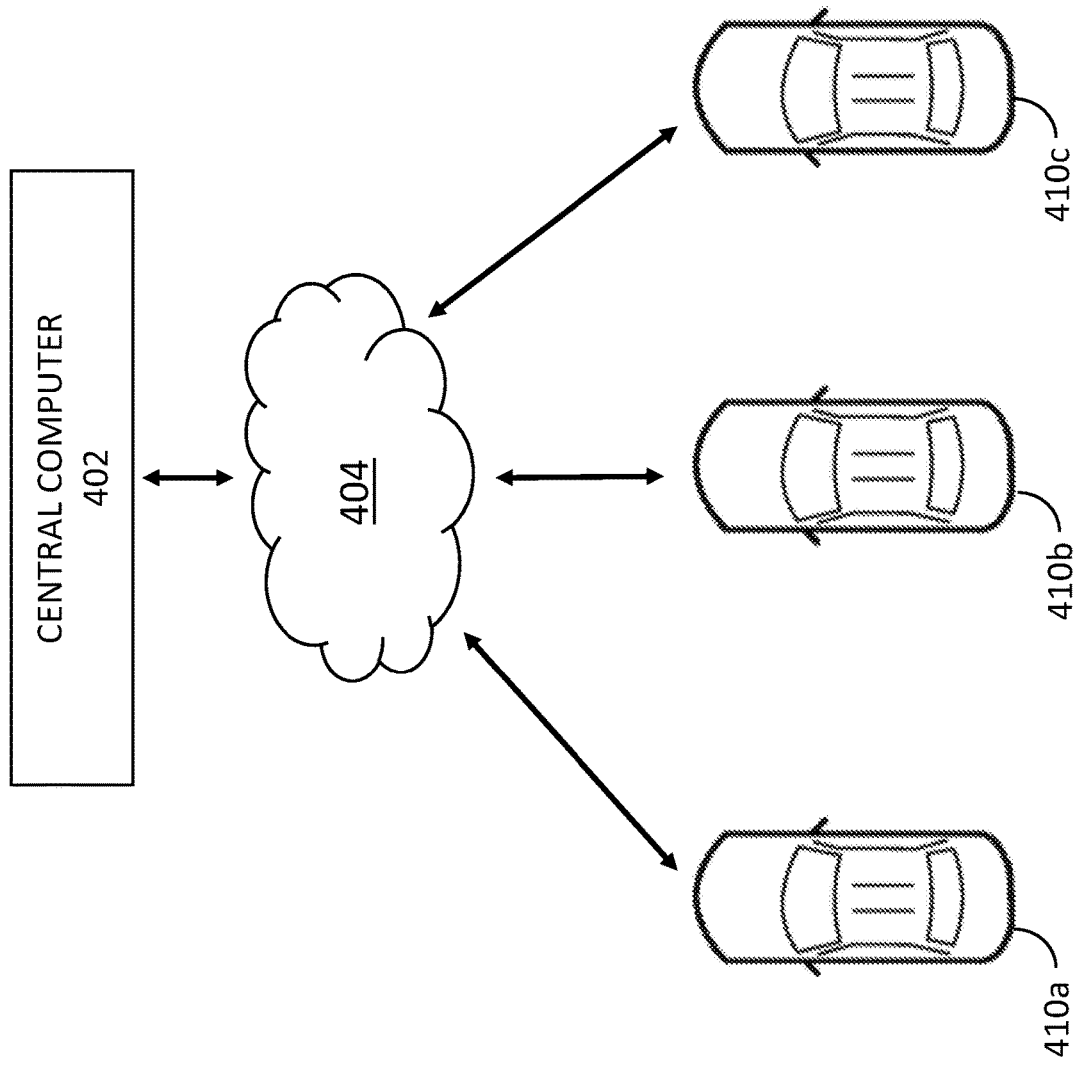
FIG. 4 is a diagram illustrating a fleet of autonomous vehicles in communication with a central computer, according to some embodiments of the disclosure.

FIG. 4 is a diagram illustrating a fleet of autonomous vehicles 410a-410c in communication with a central computer 402, according to some embodiments of the disclosure. As shown in FIG. 4, the vehicles 410a-410c communicate wirelessly with a cloud 404 and a central computer 402. The central computer 402 includes a routing coordinator and a database of information from the vehicles 410a-410c in the fleet. Autonomous vehicle fleet routing refers to the routing of multiple vehicles in a fleet. In some implementations, autonomous vehicles communicate directly with each other.

When a ride request is received from a passenger, the routing coordinator selects an autonomous vehicle 410a-410c to fulfill the ride request, and generates a route for the autonomous vehicle 410a-410c. The generated route includes a route from the autonomous vehicle's present location to the pick-up location, and a route from the pick-up location to the final destination. In some examples, the ride request includes a stop request and the generated route includes a route to the stop location. The generated route also includes instructions for autonomous vehicle behavior during the stopping interval. In various examples, the generated route includes instructions for a parking location during the stopping interval and/or the generated route includes a route for driving around during the stopping interval. Autonomous vehicle behavior during the stopping interval may depend on the stop duration as described above with respect to FIG. 3.

The generated route can be updated while the vehicle is on the route. In some examples, an intermediate stop request is received after a passenger has been picked up. The generated route is updated to include the intermediate stop, as well as to include autonomous vehicle routing instructions during the stop.

In some implementations, after an autonomous vehicle, e.g., first autonomous vehicle 410a, drops off a passenger for an intermediate stop, the routing coordinator sends the first autonomous vehicle 410a to a different route for a different passenger. In some examples, the first autonomous vehicle 410a completes the different route for the different passenger and then returns to pick up the first passenger after the intermediate stop. In some examples, the first autonomous vehicle 410a completes the different route for the different passenger and then does not return to pick up the first passenger after the intermediate stop. Instead, the routing coordinator schedules a different autonomous vehicle, e.g., second autonomous vehicle 410b, to pick up the passenger after the intermediate stop.

In some examples, it is determined whether it is acceptable to use a different autonomous vehicle to pick up the passenger after the intermediate stop. In one example, the central computer 402 determines whether it is acceptable to use a different autonomous vehicle to pick up the passenger after the intermediate stop. In one example, the determination of whether a different autonomous vehicle is acceptable is based on whether the passenger left items or inside the first autonomous vehicle 410a. In another example, the determination of whether a different autonomous vehicle is acceptable is based on whether the passenger had additional riders in their party, and one or more additional riders remained in the first autonomous vehicle 410a during the intermediate stop. As described above, sensors in the first autonomous vehicle 410a can be used to detect items and/or people inside the vehicle.

Each vehicle 410a-410c in the fleet of vehicles communicates with a routing coordinator. Information gathered by various autonomous vehicles 410a-410c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals.

In various examples, the data collected by the routing coordinator is used to determine autonomous vehicle routing during a stopping interval. Additionally, data collected by the routing coordinator is used to determine autonomous vehicle fleet efficiency when allowing a user to reserve the autonomous vehicle for exclusive use during a stopping interval. In some examples, the fee charged for exclusive use of an autonomous vehicle during a stopping interval is correlated with fleet efficiency. In particular, pricing can be adjusted dynamically to encourage passengers to select the more efficient option. For example, the greater the negative impact of exclusive use of a specific autonomous vehicle on overall fleet efficiency, the higher the cost of the exclusive use option. Thus, in some examples, the exclusive use option is more expensive during a busy time period and less expensive during a slow time period.

According to various implementations, a set of parameters can be established that determine which metrics are considered (and to what extent) in determining routes or route modifications. In some examples, the route includes autonomous vehicle routing during a stopping interval, as described in greater detail with respect to FIG. 3. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes on time pick up of a passenger at the end of an intermediate stop.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination and/or any intermediate stop. Similarly, in some examples, during an intermediate stop, the onboard computer determines whether the autonomous vehicle parks or continues to drive and circles back to the pick-up location. In some implementations, the routing coordinator in the central computing system 402 generates a route for each selected autonomous vehicle 410a-410c, and the routing coordinator determines a route for the autonomous vehicle 410a-410c to travel from the autonomous vehicle's current location to a first intermediate stop.

Example of a Stop Request Interface

Figures 5A, 5B:
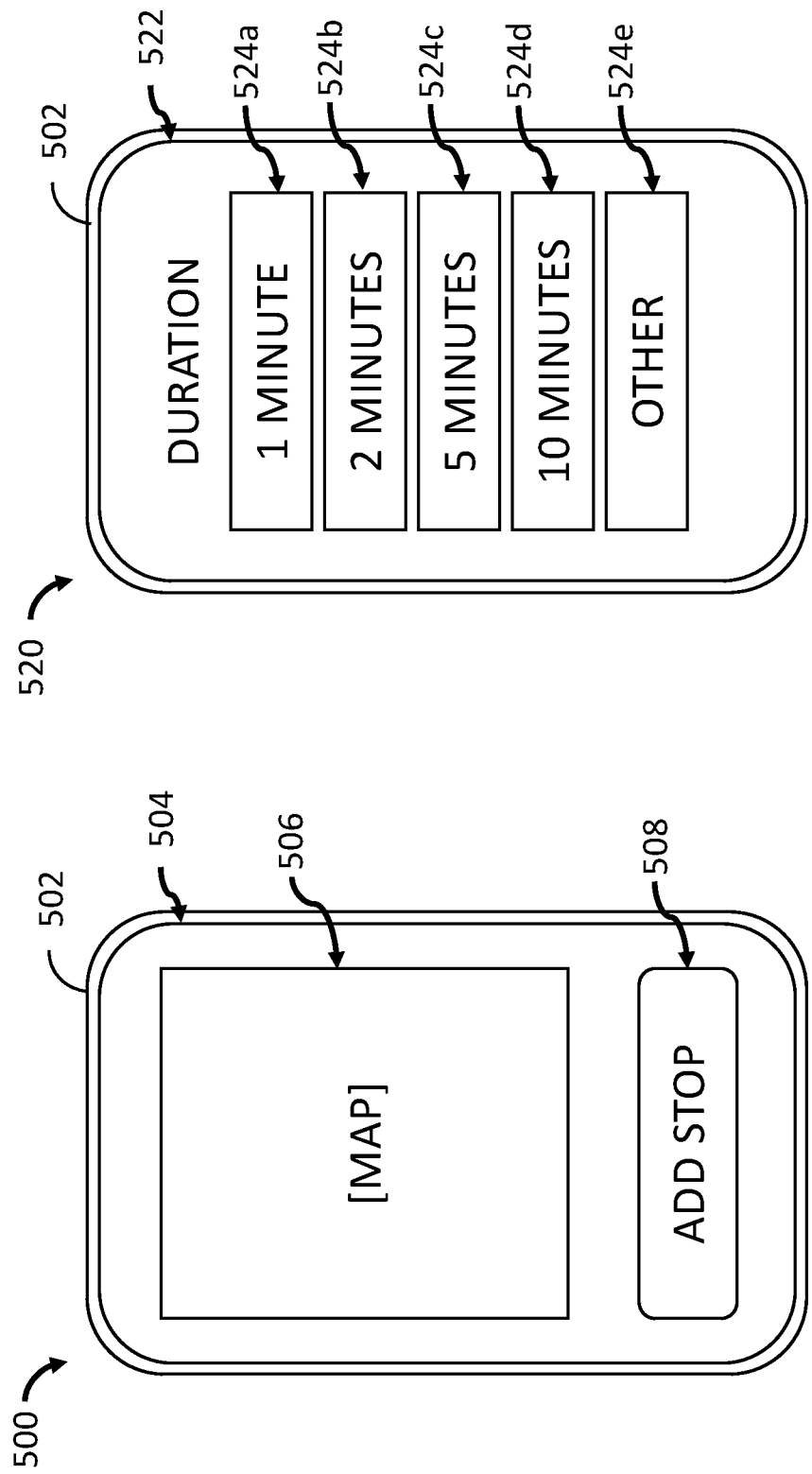
FIGS. 5A-5B show examples of an interface for requesting stops, according to some embodiments of the disclosure.

FIGS. 5A-5B show examples 500, 520 of an interface for requesting stops, according to some embodiments of the disclosure. FIG. 5A shows an example 500 of a device 502 showing an interface 504 having a map 506 and an "add stop" button 508. In various examples, the map 506 shows a user's location and/or a selected destination location. In some examples, the map shows a route between the user's location and a destination location. In various implementations, the map shows one or more suggested stops. The suggested stops may be stops the user has previously requested, stops similar to stops the user has previously requested, stops other users have requested, and/or sponsored stop suggestions. In some implementations, the map does not show suggested stops.

The interface 504 includes an "add a stop" button 508 for the user to add an intermediate stop to a route. Selecting the "add a stop" button 508 allows the user to select an intermediate stop location by selecting a suggested stop, searching for a stop by name, and/or adding an address of a stop. The stop is added to the user's route.

After adding an intermediate stop, the user is prompted to indicate the duration of the selected stop. FIG. 5B shows an example 520 of the device 502 showing an interface 522 having duration selections. In the example shown in FIG. 5B, the user can select a stop duration of "1 minute" 524a, "2 minutes" 524b, "5 minutes" 524c, "10 minutes" 524c, or "other" 524e. In some examples, if the user selects "other" 524e, the user is then prompted to set the stop duration. In other examples, if the user selects "other" 524e, the user is prompted to enter a stop duration. In various implementations, the specific durations of the duration selections 524a-524e depends on the type of store at the stop destination. In some examples, the specific durations are based on stop duration predictions based on stops at the selected location made by the same and/or other users. As discussed above, during the stopping interval, the user may be prompted to update and/or confirm the pick-up time.

Example of a Computing System for Ride Requests

FIG. 6 shows an example embodiment of a computing system 600 for implementing certain aspects of the present technology. In various examples, the computing system 600 can be any computing device making up the onboard computer 104, the central computing system 402, or any other computing system described herein. The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

In some implementations, the computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 600 includes at least one processing unit (CPU or processor) 610 and a connection 605 that couples various system components including system memory 615, such as read-only memory (ROM) 620 and random access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 includes an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as a processor 610, a connection 605, an output device 635, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for adding stops to an autonomous vehicle route, comprising receiving a ride request including a pick-up location and a destination location, picking up a passenger at the pick-up location, receiving an intermediate stop request, wherein the intermediate stop request includes a stopping interval, dropping off the passenger at the intermediate stop, and determining autonomous vehicle driving behavior during the intermediate stop.

Example 2 provides a method according to example 1, further comprising predicting the stopping interval based on a previous stop request.

Example 3 provides a method according to one or more of the preceding examples, including predicting the stopping interval based on type of stop location.

Example 4 provides a method according to one or more of the preceding examples wherein determining autonomous vehicle driving behavior during the intermediate stop includes at least one of parking the autonomous vehicle and driving the autonomous vehicle.

Example 5 provides a method according to one or more of the preceding examples wherein driving the autonomous vehicle comprises driving the autonomous vehicle along a circular route.

Example 6 provides a method according to one or more of the preceding examples wherein driving the autonomous vehicle comprises fulfilling at least one second ride request.

Example 7 provides a method according to one or more of the preceding examples including picking up the passenger at the intermediate stop, and continuing to the destination location.

Example 8 provides a method according to one or more of the preceding examples wherein receiving the ride request includes receiving the intermediate stop request.

Example 9 provides a method according to one or more of the preceding examples including discontinuing the autonomous vehicle route at the intermediate stop.

Example 10 provides a method for providing routes to a set of autonomous vehicles, including receiving a ride request including a pick-up location and a destination location, selecting a first autonomous vehicle from the set of autonomous vehicles for fulfilling the ride request, routing the first autonomous vehicle to the pick-up location, receiving an intermediate stop request for the ride request, wherein the intermediate stop request includes an intermediate stop location and a stopping interval, routing the first autonomous vehicle to the intermediate stop location, and determining whether to route the first autonomous vehicle to the intermediate stop location at an end of the stopping interval.

Example 11 provides a system according to one or more of the preceding examples, wherein determining includes determining not to route the first autonomous vehicle to the intermediate stop location at the end of the stopping interval and routing a second autonomous vehicle to the intermediate stop location at the end of the stopping interval.

Example 12 provides a system according to one or more of the preceding examples including determining driving behavior of the first autonomous vehicle during the stopping interval.

Example 13 provides a system according to one or more of the preceding examples wherein determining the driving behavior during the stopping interval includes at least one of routing the first autonomous vehicle to a parking space and routing the first autonomous vehicle along a circular route.

Example 14 provides a system according to one or more of the preceding examples wherein determining the driving behavior during the stopping interval includes selecting the first autonomous vehicle for fulfilling a second ride request.

Example 15 provides a system according to one or more of the preceding examples including updating the stopping interval, wherein updating the stopping interval includes updating an end time of the stopping interval.

Example 16 provides a system according to one or more of the preceding examples, wherein updating the stopping interval includes predicting the stopping interval based on one of a previous stop request and type of stop location.

Example 17 provides a system for addition of an intermediate stop to an autonomous vehicle route, including a central computing system including a routing coordinator configured to receive a ride request including a pick-up location and a destination location, and select a first autonomous vehicle for fulfilling the ride request, and an onboard computing system on the first autonomous vehicle configured to pick up a passenger at the pick-up location, receive an intermediate stop request, wherein the intermediate stop request includes an intermediate stop location and a stopping interval, and drop off the passenger at the destination location.

Example 18 provides a method according to one or more of the preceding examples, wherein the central computing system is further configured to receive the intermediate stop request, and send the intermediate stop request to the first autonomous vehicle.

Example 19 provides a method according to one or more of the preceding examples, wherein the central computing system is further configured to route the first autonomous vehicle to the intermediate stop location, and determine whether to route the first autonomous vehicle to the intermediate stop location at an end of the stopping interval.

Example 20 provides a method according to one or more of the preceding examples, wherein the central computing system is further configured to determine first autonomous vehicle driving behavior during the stopping interval, and send routing instructions to the first autonomous vehicle.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for adding stops to an autonomous vehicle route, comprising:
   receiving a ride request including a pick-up location and a destination location;
   picking up a passenger at the pick-up location;
   accessing a database of business advertisements, and identifying a set of businesses in the database along a route between the pick-up location and the destination location;
   providing a stop suggestion to the passenger, wherein the stop suggestion corresponds to one of the set of businesses, and wherein the stop suggestion includes a stop location for an intermediate stop;
   receiving an intermediate stop request based on the stop suggestion, wherein the intermediate stop request includes a stopping interval;
   dropping off the passenger at the intermediate stop;
   determining autonomous vehicle driving behavior during the intermediate stop;
   predicting the stopping interval based on at least one of a previous stop request and a type of stop location;
   determining a passenger location within the stop location; and
   updating the predicted stopping interval based on the passenger location.

2. The method of claim 1, wherein determining autonomous vehicle driving behavior during the intermediate stop includes at least one of parking the autonomous vehicle and driving the autonomous vehicle.

3. The method of claim 2, wherein driving the autonomous vehicle comprises one of:
   driving the autonomous vehicle along a circular route and fulfilling at least one second ride request.

4. The method of claim 1, further comprising:
   picking up the passenger at the intermediate stop; and continuing to the destination location.

5. The method of claim 1, wherein receiving the ride request includes receiving the intermediate stop request.

6. The method of claim 1, further comprising discontinuing the autonomous vehicle route at the intermediate stop.

7. The method of claim 1, further comprising displaying the stop suggestion and an advertisement for the corresponding one of the set of businesses in a passenger ridehail application interface.

8. The method of claim 7, further comprising accessing at least one of a passenger calendar and passenger notes, wherein providing the stop suggestion includes providing the stop suggestion based on information from at least one of the passenger calendar and the passenger notes.

9. The method of claim 1, wherein determining autonomous vehicle driving behavior during the intermediate stop includes at least one of capturing images for a database and recording data on a nearby route.

10. The method of claim 1, further comprising predicting a likelihood of an intermediate stop request.

11. A method for providing routes to a set of autonomous vehicles, comprising:
    receiving a ride request including a pick-up location and a destination location;
    selecting a first autonomous vehicle from the set of autonomous vehicles for fulfilling the ride request;
    routing the first autonomous vehicle to the pick-up location;
    accessing a database of business advertisements, and identifying a set of businesses in the database along a route between the pick-up location and the destination location;
    providing a stop suggestion for an intermediate stop including an intermediate stop location, wherein the stop suggestion corresponds to one of the set of businesses;
    receiving an intermediate stop request for the ride request, based on the stop suggestion, wherein the intermediate stop request includes a stopping interval;
    routing the first autonomous vehicle to the intermediate stop location;
    stopping at the intermediate stop location and then routing the first autonomous vehicle away from the intermediate stop location;
    determining a passenger location within the stop location;

updating the stopping interval based on the passenger location; and determining, at the end of the stopping interval, whether to return the first autonomous vehicle back to the intermediate stop.

12. The method of claim 11, wherein determining includes:
    determining not to route the first autonomous vehicle back to the intermediate stop location at the end of the stopping interval, and
    routing a second autonomous vehicle to the intermediate stop location at the end of the stopping interval.

13. The method of claim 11, further comprising determining driving behavior of the first autonomous vehicle during the stopping interval.

14. The method of claim 13, wherein determining the driving behavior during the stopping interval includes at least one of;
    routing the first autonomous vehicle to a parking space,
    routing the first autonomous vehicle along a circular route, and
    selecting the first autonomous vehicle for fulfilling a second ride request.

15. The method of claim 11, further comprising updating the stopping interval, wherein updating the stopping interval includes predicting the stopping interval based on one of a previous stop request and a type of stop location.

16. The method of claim 11, wherein a passenger remains in the first autonomous vehicle during the intermediate stop.

17. A system for addition of an intermediate stop to an autonomous vehicle route, comprising:
    a central computing system including a routing coordinator configured to:
        receive a ride request including a pick-up location and a destination location,
        access a database of business advertisements and identify a set of businesses in the database along a route between the pick-up location and the destination location;
        provide a stop suggestion, wherein the stop suggestion includes a stop location for an intermediate stop, and wherein the stop suggestion corresponds to one of the set of businesses, and
        select a first autonomous vehicle for fulfilling the ride request; and
    an onboard computing system on the first autonomous vehicle configured to:
        route the first autonomous vehicle to pick up a passenger at the pick-up location;
        receive an intermediate stop request, based on the stop suggestion, wherein the intermediate stop request includes an intermediate stop location and a stopping interval; and
        route the first autonomous vehicle to drop off the passenger at the destination location;
    wherein the central computing system is further configured to:
        determine a passenger location within the stop location;
        update the stopping interval based on the passenger location;
        transmit the updated stopping interval to the first autonomous vehicle.

18. The system of claim 17, wherein the central computing system is further configured to receive the intermediate stop request, and send the intermediate stop request to the first autonomous vehicle.

19. The system of claim 17, wherein the central computing system is further configured to route the first autonomous vehicle to the intermediate stop location, and determine whether to route the first autonomous vehicle to the intermediate stop location at an end of the stopping interval.

20. The system of claim 17, wherein the central computing system is further configured to determine first autonomous vehicle driving behavior during the stopping interval, and send routing instructions to the first autonomous vehicle.

* * * * *